United States Patent [19]

Frieder, Jr.

[11] 4,374,301
[45] Feb. 15, 1983

[54] LOCAL EXTERNAL COMMUNICATION DEVICE FOR ENCLOSED HELMET AND MASK ASSEMBLY

[75] Inventor: Leonard P. Frieder, Jr., Dalton, Pa.

[73] Assignee: Gentex Corporation, Carbondale, Pa.

[21] Appl. No.: 188,510

[22] Filed: Sep. 18, 1980

[51] Int. Cl.³ ............................................. H04M 1/02
[52] U.S. Cl. .................................... 179/1 R; 179/157; 179/1 SW
[58] Field of Search ........... 179/1 R, 1 H, 1 P, 1 SW, 179/1 UW, 156 R, 156 A, 157

[56] References Cited

U.S. PATENT DOCUMENTS 3,180,333 4/1965 Lewis ............................... 179/156 R
3,588,359 6/1971 Cribb ................................... 179/1 R

FOREIGN PATENT DOCUMENTS 316403 11/1919 Fed. Rep. of Germany ... 179/156 R
1078179 3/1960 Fed. Rep. of Germany ... 179/156 R Primary Examiner—George G. Stellar
Attorney, Agent, or Firm—Shenier & O'Connor

[57] ABSTRACT

A local external communication system for use with an enclosed helmet and mask assembly covering the head, ears, nose and mouth of the wearer and provided with earphones and a microphone and a plug for connection with a radio or intercom system, in which a housing adapted to be carried on a wearer's body houses a battery, a speaker and a microphone and carries a receptacle for receiving the communications plug of the mask and helmet assembly. The device includes a unity gain amplifier system having a peak limiting circuit associated with the microphone to limit amplification of external sounds to a safe level. A switch permits the wearer selectively to turn the device off, to listen only, or to both speak and listen through the device.

9 Claims, 4 Drawing Figures

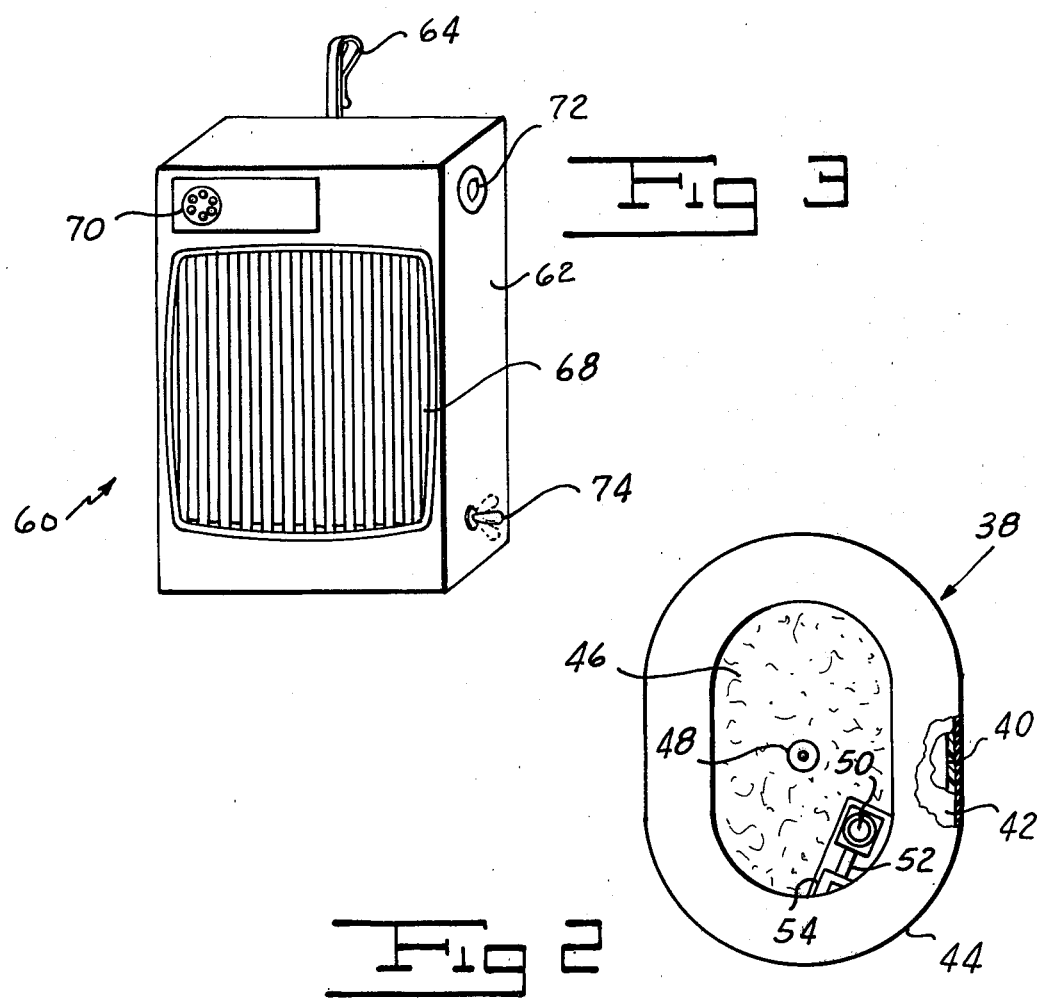
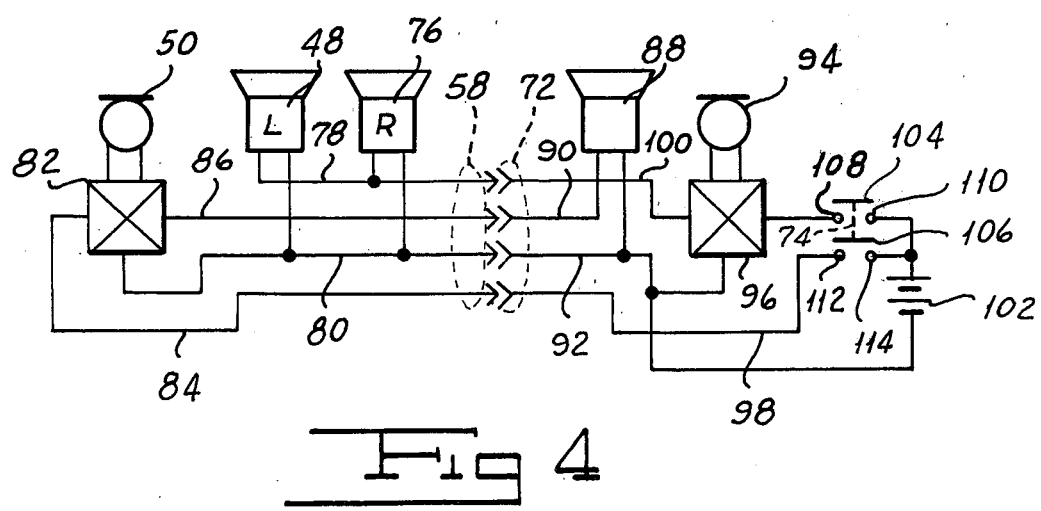

LOCAL EXTERNAL COMMUNICATION DEVICE FOR ENCLOSED HELMET AND MASK ASSEMBLY

FIELD OF THE INVENTION

My invention relates to a communication device and, more particularly, to a communication device which permits a person wearing a helmet and mask assembly which covers the ears, nose and mouth, and which is provided with a communication system adapted to be plugged into a radio system, to communicate locally without removing the helmet and mask, while at the same time protecting the wearer against excessively high sound levels of ambient noise.

BACKGROUND OF THE INVENTION

There are many instances in which an individual working in an atmosphere hostile to breathing is provided with a mask assembly which covers the nose and the mouth. In many instances the mask assembly is provided with a communication system including an external lead having a plug adapted to be inserted into an intercom or radio system. One particular system of this type known in the art is a helmet assembly provided with sound attenuating earcups which exclude ambient sound but which are provided with earphones adapted to receive signals from a radio, or intercom system, or the like. Many of these helmet assemblies are provided with oxygen masks which cover the nose and the mouth of the wearer and which are supplied from a suitable source of oxygen to permit the wearer to function in a rarified atmosphere or in an atmosphere which is contaminated. In such combined helmet and mask assemblies, either the helmet assembly may be provided with a contact microphone or the mask assembly may be provided with a microphone. In either instance, the microphone likewise is adapted to be plugged into a radio or intercom, or combined radio and intercom system. One specific example of such a combined mask and helmet assembly is that used by the crews of high performance aircraft. In such instances, when the crew man is in position in the aircraft, his oxygen hose is releasably connected to the oxygen supply and his communication system is plugged into the radio and inter system. When he leaves the aircraft, the hose is detached from the supply and his communication system is unplugged.

When the crew man of an aircraft of the type described above is in the "ready" room, he is required to be so equipped as to be able to take his position in the aircraft in the shortest possible period of time. In order to be in such condition, he should have his helmet on and he may even have his mask in position over his nose and mouth and in sealing engagement with his face, so that he breathes through the disconnected oxygen hose or through a filtered air source.

Under the condition just described, the wearer of the helmet and mask assembly cannot communicate locally. First, the sound attenuating earcups of the helmet assembly prevent him from hearing ambient sounds. Secondly, he cannot be heard to speak since his nose and mouth are sealed from the outside atmosphere, except through the disconnected oxygen supply tube or filter assembly, so that any attempt on his part to speak would be muffled.

Similarly any other individual wearing a mask having a communication arrangement adapted to be plugged into an external system cannot communicate locally while wearing the mask.

SUMMARY OF THE INVENTION

One object of my invention is to provide a local external communication device for use with a mask assembly which encloses the nose and mouth of the wearer and which is provided with communication adapted to be plugged into an external system.

Another object of my invention is to provide a local external communication device for use with a helmet and face mask assembly having a microphone and earphones adapted to be plugged into an intercom or the like, which device limits the level of external sound fed to the earphone.

Yet another object of my invention is to provide a local external communication device for use with a helmet and mask assembly, which selectively permits the wearer only to listen or both to listen and to speak through the device.

A still further object of my invention is to provide a local external communication device for use with a combined mask and helmet assembly which is simple and compact.

Other and further objects of my invention will appear from the following description.

In general my invention contemplates the provision of a local external communication system for use with an enclosed helmet and mask assembly covering the head, ears, nose and mouth of the wearer and provided with earphones and a microphone and a plug for connection with a radio or intercom system, in which a housing adapted to be carried on a wearer's body houses a battery, a speaker and a microphone and carries a receptacle for receiving the communications plug of the mask and helmet assembly. An amplifier in the housing limits the level of external sound fed to the earphones by the housing microphone. I provide the device with a switch which permits the wearer selectively to turn the device off, to listen only, or to both speak and listen through the device.

BRIEF DESCRIPTION OF THE DRAWINGS

In the accompanying drawings to which reference is made in the instant specification and which are to be read in conjunction therewith and in which like reference numerals are used to indicate like parts in the various views:

FIG. 2 is a view from the inside of an earcup assembly of the helmet assembly with which my device is used with parts broken away and with other parts shown in section.

FIG. 3 is a perspective view of my local external communication device for use with an enclosed helmet and mask assembly.

FIG. 4 is a schematic view illustrating the connection between the internal communication elements of the helmet assembly with which my device is used and the communication elements of my device.

DESCRIPTION OF THE PREFERRED EMBODIMENT

Figure 1:
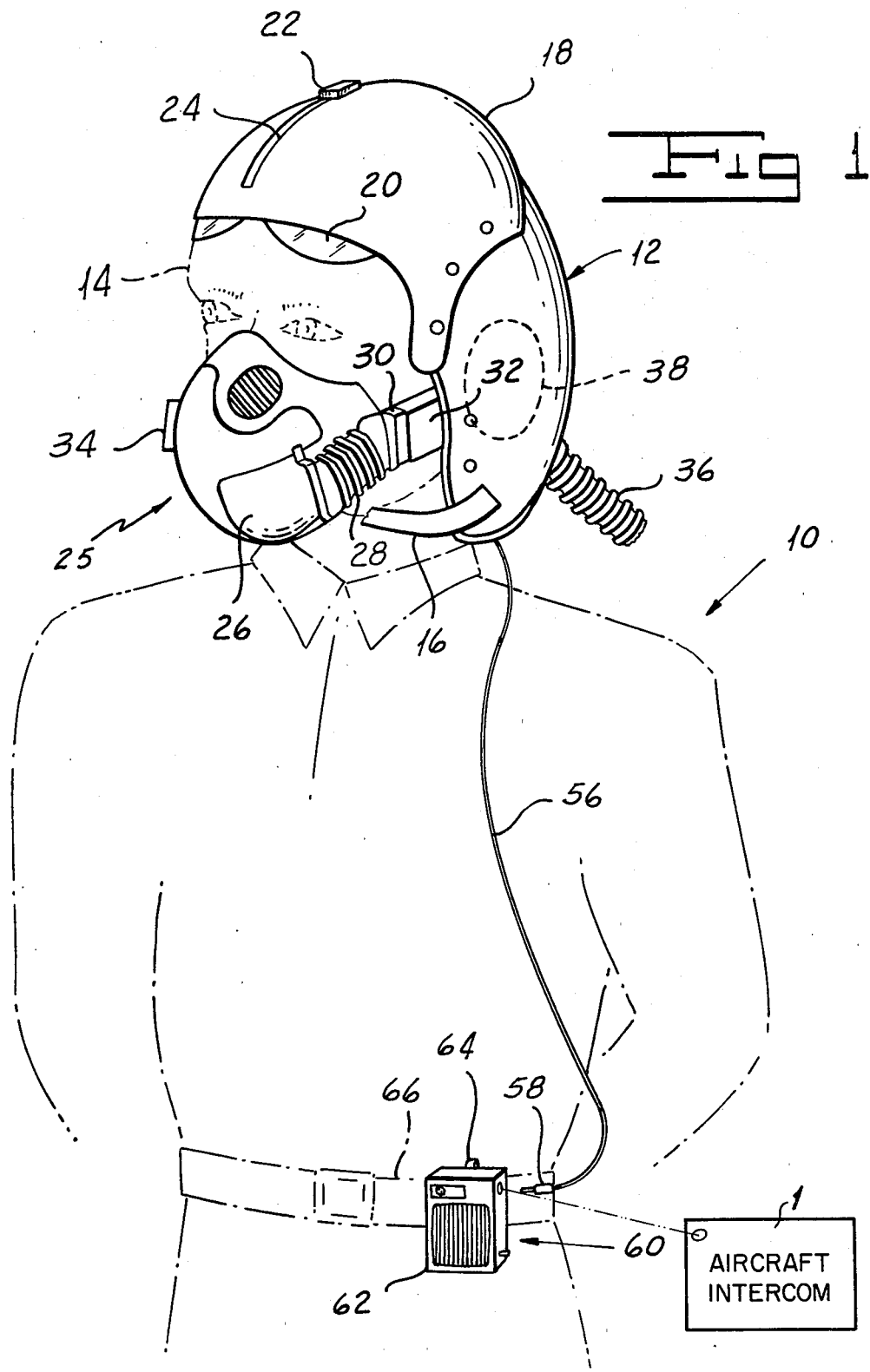
FIG. 1 is a perspective view of a person wearing an enclosed helmet and mask assembly and provided with my local external communication device.

Referring now to the drawings, an individual indicated generally by the reference character 10 is wearing a helmet assembly indicated generally by the reference character 12 on his head 14. Any suitable means known to the art, such as a chin strap 16 may be used to hold the helmet assembly 12 on the wearer's head 14. The assembly 12 may include a visor housing 18 adapted to receive a visor 20 in the retracted position thereof shown in FIG. 1. A releasable element 22 connected to the visor 20 through a slot 24 may be operated in a manner known to the art to move the visor 20 to a position at which it covers the eyes of the wearer. A mask indicated generally by the reference character 25 of any suitable type known to the art is adapted to enclose the wearer's nose and mouth and to provide a seal with the wearer's face. The mask 25 includes an oxygen inlet 26 coupled by a hose 28 to a connector 30 adapted to be releasably received in a receptacle 32 on the helmet assembly 12. The other side of the mask may be secured to the helmet assembly by any suitable means, such for example as by a strap 34. Receptacle 32 is connected to an oxygen inlet hose 36 adapted to be releasably connected to a supply (not shown) of oxygen.

Referring now to FIGS. 1 and 2, the helmet assembly 12 includes a pair of sound attenuating earcup assemblies, the left hand earcup assembly 38 of which is illustrated in the drawings. The assembly 38 includes a relatively rigid, hollow body of generally elliptical shape having a wall 40 and an inwardly directed flange 42. In one type of sound attenuating earcup known in the art, the flange 42 receives a cover 44 formed of rubber or the like. One or more bodies of sponge rubber, or the like, form an insert 46 in the body of the assembly 38 to position an earphone 48 at a location at which the wearer's ear receives sound from the earphone.

In one form of combined mask and helmet assembly, a contact microphone 50 may be supported on a spring arm 52 carried by a bracket 54 inside the earcup assembly 38, so that in response to vibrations produced when the wearer speaks contact microphone 50 produces an output signal.

It will be readily appreciated that the helmet assembly 12 includes a right-hand sound attenuating earcup assembly (not shown) also provided with an earphone. It will further be appreciated that a microphone may be positioned within the mask 25 rather than inside the earcup assembly 38. Whatever particular arrangement is used, an external lead is adapted to connect the helmet and mask communication elements described hereinabove to a radio or intercom system 1 when the person 10, such as a pilot or other crew member is in his working position in the aircraft. To this end, the lead 56 is provided with a plug 58 of a type known in the art. It will readily be appreciated that all of the structure thus far described is known in the art.

Referring now to FIGS. 1, and 3, my external communicator device includes a case or housing 62 provided with a clip 64, by means of which the case 62 can be attached to the belt 66, for example, worn by the person 10. The front of the housing or case 62 is formed with a grille 68 for the speaker of the unit. I mount a microphone inlet element 70 in the front of the case 62. I provide one side wall of the case 62 with a receptacle 72 adapted to receive the plug 58. A three-position switch actuating element 74 is adapted to be moved from a neutral or off position illustrated in full lines in FIG. 3 to one of two positions illustrated in broken lines in the figure and corresponding respectively to a condition in which only the microphone of the unit 60 is operating and a condition in which both microphones are operating.

Referring now to FIG. 4, I connect the left-hand earphone 48 and a right-hand earphone 76 between an input line 78 and a ground line 80. An amplifier 82 associated with the contact microphone 50 and forming part of the helmet-carried electronics is connected between a 6 volt power input line and the ground line 80, so as to produce an output signal on a line 86 when the person wearing the helmet speaks.

The speaker 88 of my unit 60 is connected between a signal input line 90 and a ground line 92 of the unit 60. The microphone 94 of the unit 60, which is positioned behind the inlet element 70 provides a signal input to an amplifier 96, one terminal of which is connected to ground line 92 and the other terminal of which is adapted to be connected to a battery 102 in a manner to be described to cause the amplifier 96 to produce an output signal on a line 100 when a person in the vicinity of the individual carrying the unit 60 speaks. Amplifier 96 is a unity gain amplifier incorporating a peak limiting network which limits amplification of external noise to a predetermined maximum sound pressure level. Preferably I limit the noise level transmitted to the earphones to about 85 decibels A scale as being consistent with known hearing loss damage risk criteria.

The switch associated with the actuator 74 includes an upper contactor 104 and a lower contactor 106 which are ganged. This switch also includes a pair of upper contacts 108 and 110 and a pair of lower contacts 112 and 114. The position of the elements making up the switch operated by actuator 74 are shown in FIG. 4 in the neutral position corresponding to the position of the switch actuator shown in full lines in FIG. 3. From this position, actuator 74 can be operated to move the ganged contactors 104 and 106 upwardly as viewed in FIG. 4, so that the lower contactor 106 bridges the contacts 108 and 110. In this condition of the switch, the potential of battery 102 is applied only to the amplifier 96. Alternately, the switch actuator 74 can be operated to move the contacts 104 and 106 downwardly, so that contactor 104 bridges contacts 108 and 110 and contactor 106 bridges contacts 112 and 114. In this condition of the switch, the potential of battery 102 is applied both to the amplifier 96 and to a power output line 98. It will readily be appreciated that I may, if desired, entirely eliminate actuator 74 and its associated switch. Alternatively, for example, I could provide a switch (not shown) in the plug receptacle 72 which would be actuated upon the insertion therein of plug 58.

In use of my local external communication device, the pilot 10, or the like, wearing the helmet assembly and mask assembly 25 when in an area outside his customary position as a member of the crew of the high performance aircraft, or the like, with the plug 58 disconnected from the aircraft communication system and with the oxygen hose 36 disconnected from the aircraft oxygen supply system, he may provide himself with the local communication afforded by my device 60 by inserting the plug 58 into the receptacle 72. As is evident from the showing of FIG. 4, when this is done lines 78, 86, 80 and 84 of the helmet and mask communication system are connected respectively to lines 100, 90 92 and 98 of my device 60. Next, in order to provide himself with the local external communication capability, he can move the actuator 74 in a direction to cause contactor 104 to bridge the contacts 108 and 110 and contactor 106 to bridge the contacts 112 and 114. Under these conditions, power from battery 102 is applied both to the amplifier 96 associated with microphone 94, but also to the amplifier 82 associated with microphone 50. The crew member 10 then can commmunicate with persons in the area, while wearing the helmet assembly 12 and the mask assembly 25. As an alternative, the crew member 10 may move the switch actuator 74 to position contactors 104 and 106, so that only contactor 106 bridges the contacts 108 and 110, so that power is applied only to the amplifier 96 and not to the amplifier 82. Under these conditions, the device 60 serves only to provide input audio signals to the earphones 48 and 76. Such operation may be desirable in the event that the crew member 10 partially disengages the mask assembly 25 for comfort, so as to permit him to speak. At the same time, in order to remain in the ready condition, he retains the helmet assembly 12 on his head 14, so that ambient sounds can reach him only through the earphones 48 and 76. Preferably, the battery 102 is of the rechargeable type, so that it can be recharged, rather than requiring replacement at relatively frequent intervals. While I have shown and described my local communication device in use by a person such as an aircraft crew man wearing a helmet and oxygen mask, it will readily be appreciated that it would as well be used by any other person similarly equipped. That is to say, my system might be used with any mask system for a hostile environment and having communication adapted to be plugged into an intercom or the like. Moreover, while I have specifically shown a contact microphone as a communication element of a mask and helmet assembly, my device is readily adapted for use with any microphone enclosed within a system or shield from the external.

It will be seen that I have accomplished the objects of my invention. I have provided a local external communication device for use with a helmet and mask assembly which covers the ears, nose and mouth of the wearer. My local external communication assembly may be operated alternatively to provide the wearer with full external communication capability, or with only the capability of hearing local sound. My assembly limits the level of local external sound communicated to the ears of the wearer. It is compact for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A local external communication device for use with an assembly which covers the ears and mouth of the wearer and which is provided with a communication system comprising a microphone adapted to be connected to a source of power and an earphone and a lead provided with a first coupling element for connecting said communication system to a radio or intercom system including in combination, a housing, a speaker in said housing, a microphone in said housing, a battery in said housing, a second coupling element on said housing adapted to mate with said first coupling element to form an electrical connection between said communication system and said device, said coupling elements when engaged connecting said communication system microphone to said speaker and connecting said device microphone to said earphone, a three-position switch on said housing, said switch in a first position connecting said battery to both of said microphones with said coupling elements engaged, said switch in a second position connecting said battery only to said device microphone, said switch in said third position disconnecting said battery from both said microphones, and means for detachably securing said housing to the body of a wearer.

2. A local external communication device for use with an assembly which covers the ears and mouth of the wearer and which is provided with a communication system comprising a microphone adapted to be connected to a source of power and an earphone and a lead provided with a first coupling element for connecting said communication system to a radio or intercom system including in combination, a housing, a speaker in said housing, a microphone in said housing, a battery in said housing, a second coupling element on said housing adapted to mate with said first coupling element to form an electrical connection between said communication system and said device, said coupling elements when engaged connecting said communication system microphone to said speaker and connecting said device microphone to said earphone, and a three position switch on said housing, said switch in a first position connecting said battery to both of said microphones with said coupling elements engaged, said switch in a second position connecting said battery only to said device microphone, said switch in said third position disconnecting said battery from both said microphones.

3. A local external communication device for use with an assembly which covers the ears and mouth of the wearer and which is provided with a communication system comprising a microphone adapted to be connected to a source of power and an earphone and a lead provided with a first coupling element for connecting said communication system to a radio or intercom system including in combination, a housing, a speaker in said housing, a microphone in said housing, a battery in said housing, a second coupling element on said housing adapted to mate with said first coupling element to form an electrical connection between said communication system and said device, said coupling elements when engaged connecting said communication system microphone to said speaker and connecting said device microphone to said earphone, a switch on said housing, said switch in a first position connecting said battery to both of said microphones with said coupling elements engaged, said switch in a third position disconnecting said battery from both said microphones.

4. A local external communication device for use with an assembly which covers the ears and which is provided with a communication system comprising an earphone and a lead provided with a first coupling element for connecting said communication system to a radio or intercom system including in combination, a housing, a microphone in said housing, a battery in said housing, a second coupling element on said housing adapted to mate with said first coupling element to form an electrical connection between said communication system and said device, said coupling elements when engaged connecting said device microphone to said earphone, a switch on said housing, said switch in a first position connecting said switch in a first position connecting said battery to said device microphone, said switch in a second position disconnecting said battery from said microphone.

5. A local external communication device for use with an assembly which covers the ears and mouth of the wearer and which is provided with a communication system comprising a microphone adapted to be connected to a source of power and an earphone and a lead provided with a first coupling element for connecting said communication system to a radio or intercom system including in combination, a housing, a speaker in said housing, a microphone in said housing, a battery in said housing, a second coupling element on said housing adapted to mate with said first coupling and means including said coupling elements when engaged connecting said communication system microphone to said speaker and connecting said device microphone to said earphone, and connecting said battery to both of said microphones with said coupling elements engaged.

6. A local external communication device for use with an assembly which covers the ears of the wearer and which is provided with a communication system comprising an earphone and a lead provided with a first coupling element for connecting said communication system to a radio or intercom system including in combination, a housing, a microphone in said housing, a battery in said housing, a second coupling element on said housing adapted to mate with said first coupling and means including said coupling elements when engaged connecting said device microphone to said earphone and connecting said battery only to said device microphone.

7. A local external communication device for use with an assembly which covers the ears and mouth of the wearer and which is provided with a communication system comprising a microphone adapted to be connected to a source of power and an earphone and a lead provided with a first coupling element for connecting said communication system to a radio or intercom system including in combination, a housing, a speaker in said housing, a microphone in said housing, a battery in said housing, a second coupling element on said housing adapted to mate with said first coupling element to form an electrical connection between said communication system and said device, said coupling elements when engaged connecting said communication system microphone to said speaker and connecting said device microphone to said earphone, a switch on said housing, said switch in a first position connecting said battery to both of said microphones with said coupling elements engaged, said switch in a second position disconnecting said battery from both said microphones.

8. A local external communication device for use with an assembly which covers the ears and which is provided with a communication system comprising an earphone and a lead provided with a first coupling element for connecting said communication system to a radio or intercom system including in combination, a housing, a microphone in said housing, a battery in said housing, an amplifier system in said housing associated with said microphone, said amplifier including a peak limiting network for limiting amplification of external noise to a predetermined safe level, a second coupling element on said housing adapted to mate with said first coupling element to form an electrical connection between said communication system and said device, said coupling elements when engaged connecting said amplifier to said earphone, a switch on said housing, said switch in a first position connecting said battery to said amplifier, said switch in a second position disconnecting said battery from said amplifier.

9. A local external communication device for use with an assembly which covers the ears of the wearer and which is provided with a communication system comprising an earphone and a lead provided with a first coupling element for connecting said communication system to a radio or intercom system including in combination, a housing, a microphone in said housing, a battery in said housing, an amplifier system in said housing associated with said microphone, said amplifier including a peak limiting network for limiting amplification of external noise to a predetermined safe level, a second coupling element on said housing adapted to mate with said first coupling and means including said coupling elements when engaged connecting said amplifier to said earphone and connecting said battery only to said amplifier.

* * * * *